United States Patent
Ichinose et al.

(10) Patent No.: US 9,758,272 B2
(45) Date of Patent: Sep. 12, 2017

(54) RESIN-COATED SEAMLESS ALUMINUM CAN

(71) Applicant: TOYO SEIKAN GROUP HOLDINGS, LTD., Tokyo (JP)

(72) Inventors: Shozo Ichinose, Yokohama (JP); Noriyoshi Obara, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 14/905,627

(22) PCT Filed: Jul. 2, 2014

(86) PCT No.: PCT/JP2014/067667
§ 371 (c)(1),
(2) Date: Jan. 15, 2016

(87) PCT Pub. No.: WO2015/019759
PCT Pub. Date: Feb. 12, 2015

(65) Prior Publication Data
US 2016/0152371 A1 Jun. 2, 2016

(30) Foreign Application Priority Data
Aug. 7, 2013 (JP) ................. 2013-164143

(51) Int. Cl.
| | |
|---|---|
| *B65D 1/12* | (2006.01) |
| *B05D 7/00* | (2006.01) |
| *C09D 167/00* | (2006.01) |
| *C23C 22/36* | (2006.01) |
| *C23C 22/83* | (2006.01) |
| *B05D 7/14* | (2006.01) |
| *B65D 25/14* | (2006.01) |
| *B65D 25/34* | (2006.01) |
| *C09D 167/02* | (2006.01) |

(52) U.S. Cl.
CPC ................. *B65D 1/12* (2013.01); *B05D 7/14* (2013.01); *B05D 7/51* (2013.01); *B65D 25/14* (2013.01);
(Continued)

(58) Field of Classification Search
CPC . B65D 1/40; B65D 1/12; B65D 25/14; B65D 25/34; B05D 7/14; B05D 7/51;
(Continued)

(56) References Cited

U.S. PATENT DOCUMENTS 3,268,433 A * 8/1966 Abere .................... C08G 63/91
204/493
3,366,591 A * 1/1968 Marshall ............ C08G 18/4615
427/388.2

(Continued)

FOREIGN PATENT DOCUMENTS

| EP | 0 905 191 A1 | 3/1999 |
| JP | 7-310189 A | 11/1995 |

(Continued)

OTHER PUBLICATIONS

International Search Report of PCT/JP2014/067667 dated Sep. 9, 2014 [PCT/ISA/210].

*Primary Examiner* — Robert J Hicks
(74) *Attorney, Agent, or Firm* — Sughrue Mion, PLLC (57) ABSTRACT

A resin-coated seamless aluminum can (10) having polyester resin coatings (5, 7) on the inner and outer surfaces thereof, the polyester resin coatings (5, 7) being formed on the inner and outer surfaces of an aluminum can body (1) via non-chromium inorganic surface-treating films (3, 3), the polyester resin coatings (3, 7) being formed of a lowly crystalline polyester to which have been introduced a copolymer unit stemming from a dibasic acid and a copolymer unit stemming from a polybasic acid having a valence of 3 or more.

8 Claims, 2 Drawing Sheets (52) U.S. Cl.
CPC ........... *B65D 25/34* (2013.01); *C09D 167/00* (2013.01); *C09D 167/02* (2013.01); *C23C 22/361* (2013.01); *C23C 22/83* (2013.01); *B05D 2202/25* (2013.01); *B05D 2252/10* (2013.01); *B05D 2701/00* (2013.01)

(58) Field of Classification Search
CPC .. C09D 167/00; C09D 167/02; C23C 22/361; C23C 22/83
USPC ......... 220/62.22, 62.11, 906; 428/35.9, 35.8, 428/35.7; 206/524.3
See application file for complete search history.

(56) References Cited

U.S. PATENT DOCUMENTS

| | | | |
|---|---|---|---|
| 3,382,295 A * | 5/1968 | Taylor, Jr. | B05D 1/24 156/283 |
| 7,749,582 B2 * | 7/2010 | Kurokawa | C09D 5/28 106/14.05 |
| 8,349,419 B2 | 1/2013 | Nishida et al. | |
| 2005/0175798 A1 | 8/2005 | Kurokawa | |
| 2006/0199023 A1 | 9/2006 | Funagi et al. | |
| 2007/0259123 A1 * | 11/2007 | Nagano | C08F 255/00 427/407.1 |
| 2010/0230288 A1 | 9/2010 | Kurokawa | |
| 2012/0091150 A1 | 4/2012 | Kanazawa et al. | |

FOREIGN PATENT DOCUMENTS

| | | |
|---|---|---|
| JP | 2001-072747 A | 3/2001 |
| JP | 2002-255169 A | 9/2002 |
| JP | 2004-018929 A | 1/2004 |
| JP | 2004-299390 A | 10/2004 |
| JP | 2005-097712 A | 4/2005 |
| JP | 2007-076012 A | 3/2007 |
| JP | 2007-076651 A | 3/2007 |
| JP | 2011-025935 A | 2/2011 |
| WO | 95/25831 A1 | 9/1995 |

* cited by examiner

RESIN-COATED SEAMLESS ALUMINUM CAN

CROSS REFERENCE TO RELATED APPLICATIONS

This application is a National Stage of International Application No. PCT/JP2014/067667, filed Jul. 2, 2014, claiming priority based on Japanese Patent Application No. 2013-164143, filed Aug. 7, 2013, the contents of all of which are incorporated herein by reference in their entirety.

TECHNICAL FIELD

This invention relates to a seamless aluminum can having polyester resin coatings formed thereon via non-chromium inorganic surface-treating films.

BACKGROUND ART

Aluminum is light in weight and easy to form as compared to steels and has been favorably used in the field of containers. Specifically, aluminum has been widely used for producing seamless cans through severe workings of forming such as drawing and ironing.

In the seamless aluminum cans mentioned above, in general, chromium type surface treating films are formed by conversion treatment on the inner and outer surfaces of the aluminum sheet that forms the cans in order to improve corrosion resistance of aluminum. Further, such seamless aluminum cans are formed through severe working of forming. Therefore, polyester resin coating or films are, usually, formed on the inner and outer surfaces of the cans via the surface-treating films.

However, to meet strong demands concerning environmental sanitation in recent years, study has been conducted extensively in connection with non-chromium inorganic surface-treating films for use as films for conversion-treating the surfaces of aluminum. For instance, a patent document 1 is proposing a resin-coated aluminum alloy can lid having surface-treating films formed on the surfaces of the aluminum by the conversion treatment by using a zirconium compound.

However, the non-chromium inorganic surface-treating film proposed above does not fully adhere to the resin coating that is formed thereon, and leaves room for improvement if it is to be applied to the seamless cans that are formed through severer working of forming than the working for forming the can lids. That is, in the resin-coated aluminum seamless cans having a resin coating formed on the non-chromium inorganic surface-treating film, adhesion is not sufficient between the resin coating and the surface-treating film. Therefore, fine scratches are formed on the outer surface during the working for forming the cans or during the working (such as necking or double-seam working) after the cans have been formed. As a result, due to the subsequent thermal hysteresis such as pasteurizing treatment (sterilization by low-temperature heating) after the content has been filled or retort sterilization, the resin coating peels (scar-caused delamination) being triggered by fine scratches and renders the appearance to become defective.

A patent document 2 is a patent application filed by the present applicant and proposes an art of forming an organic/inorganic surface-treating film containing a zirconium compound, a phosphorus compound or an organic compound, as means for solving the problem of when the non-chromium inorganic surface-treating film is applied to the resin-coated aluminum seamless cans. The above surface-treating film adheres to the resin coating to a high degree and, therefore, is capable of effectively preventing the resin coating from peeling despite the outer surface gets scratched during the working for forming the seamless cans or through the working that follows the working of forming.

According to the patent document 2, however, the organic/inorganic composite surface-treating film is formed by using, as a liquid for treating the film, an aqueous solution in which are dissolved or dispersed a zirconium compound as well as an organic compound, requiring a cumbersome operation for controlling the concentration of the treating liquid. Therefore, it is not easy to form the film, an increased cost is required for the production, and further improvements are desired.

Further, if the resin coating is formed on the metal material by extrusion lamination, a problem arouses in that neck-in (a phenomenon in which the film-like resin that is melt-extruded becomes narrower than the width of the die outlet) easily occurs. The neck-in causes irregularity in the thickness of the resin coating on the inner and outer surfaces and, therefore, causes dispersion in the properties such as closely adhering property. This becomes conspicuous particularly when a lowly crystalline polyester is used as the resin.

PRIOR ART DOCUMENTS

Patent Documents

Patent document 1: JP-A-2007-76651
Patent document 2: JP-A-2007-76012

OUTLINE OF THE INVENTION

Problems that the Invention is to Solve

It is, therefore, an object of the present invention to provide a resin-coated aluminum seamless can having non-chromium inorganic surface-treating films formed on the surfaces of an aluminum material, the non-chromium inorganic surface-treating films being easily formed by an ordinary conversion treatment by using a treating solution containing no organic compound. The resin-coated aluminum seamless can features excellent adhesion to the resin coatings formed on the surfaces thereof and, particularly, to the resin coating formed on the outer surface side, effectively prevents the resin coatings from peeling (scratch-caused delamination) triggered by the scratches despite the outer surfaces get scarred during the working for forming the cans or during the working that follows the working for forming and, further, effectively solves the problem of neck-in when the resin coatings are formed by the extrusion lamination.

Means for Solving the Problems

According to the present invention, there is provided a resin-coated seamless aluminum can having polyester resin coatings formed on inner and outer surfaces thereof, the polyester resin coatings being, respectively, formed on the inner and outer surfaces of an aluminum can body via non-chromium inorganic surface-treating films, and the polyester resin coatings being formed of lowly crystalline polyester to which have been introduced a copolymer unit stemming from a dibasic acid and a copolymer unit stemming from a polybasic acid having a valence of 3 or more.

In the resin-coated seamless aluminum can of the present invention, it is desired that:

(1) In the polyester resin coatings, the polybasic acid having a valence of 3 or more is a trimellitic acid;

(2) The polyester resin coatings are formed of polyethylene terephthalate that contains a unit stemming from an isophthalic acid as a dibasic acid copolymer unit;

(3) The polyester resin coatings contain a copolyester unit stemming from the dibasic acid copolymer unit at a ratio of 8 to 17 mol % in the whole ester units, and contain the polybasic acid copolymer component at a ratio of 0.01 to 0.5 mol % per the whole acid components;

(4) The polyester resin coating formed on the outer surface side has a two-layer structure including a first polyester layer located on the side of the aluminum can body and a second polyester layer located on the outer surface side, the first polyester layer being formed of polyester that contains dibasic acid copolymer units more, and has a crystallinity lower, than those of the second polyester layer;

(5) At least the polyester resin coating on the outer surface side is formed on the non-chromium inorganic surface-treating film via a primer layer;

(6) The non-chromium inorganic surface-treating film contains zirconium phosphate; and (7) The non-chromium inorganic surface-treating film contains zirconium atoms in amounts of 3 to 30 mg/m$^2$ and phosphorus atoms in amounts of 1 to 15 mg/m$^2$.

Effects of the Invention

In the resin-coated seamless aluminum can of the present invention, non-chromium inorganic surface-treating films are provided on the surfaces of the aluminum sheet that is to be subjected to the working for seamless forming. Here, the resin coatings are formed on the inorganic surface-treating films by using a lowly crystalline polyester that contains the dibasic acid as a copolymer component. That is, the polyester resin coatings have a low crystallinity and are rich in softness and flexibility as compared to those containing no copolymer component. Therefore, even if subjected to not only the bend working but also to such a severe working for seamless forming as draw working or ironing working, the resin coatings effectively follow the deformation caused by working the aluminum and maintain a high degree of adhesiveness to the non-chromium inorganic surface-treating films on the surfaces of aluminum. As a result, the resin coatings maintain a high degree of adhesiveness even in the subsequent workings such as necking and wrap-seam working, effectively suppressing the resin coatings from peeling (scratch-caused delamination) triggered by fine scratches in the subsequent thermal hysteresis and defective appearance.

Here, if the resin coatings are formed on the inorganic surface-treating films by using a lowly crystalline polyester, the neck-in occurs very easily at the time of extrusion lamination as described above accompanied, therefore, by the occurrence of irregularity in the thickness of the resin coatings on the inner and outer surfaces and dispersion in the properties such as closely adhering property. According to the present invention, however, the lowly crystalline polyester contains a copolymer unit stemming from the dibasic acid and a copolymer unit stemming from the polybasic acid (e.g., trimellitic acid) having a valence of 3 or more. Therefore, the problem of neck-in is effectively solved as will become obvious from Examples appearing later. That is, by introducing the polybasic acid having a valence of 3 or more into the ester unit, a crosslinked structure is formed since the ester unit works as a crosslinking point. As a result, the lowly crystalline polyester exhibits improved melt-fluidity and works to effectively suppress the occurrence of neck-in.

Further, the surface-treating films (i.e., films obtained by the conversion treatment) formed on the surfaces of the aluminum of the invention contain no chromium, and are also excellent from the environmental and hygienic standpoint. Besides, they use no organic compound. This makes it easy to control the concentration and the like in the treating vessel in which the conversion treatment is carried out and to effectively avoid a decrease in the productivity and an increase in the cost caused by cumbersome control operation.

Further, in the present invention, it is particularly desired that the polyester resin coating formed on the outer surface side has a two-layer structure including a first polyester layer located on the side of the aluminum can body and a second polyester layer located on the outer surface side, the first polyester layer being formed of a polyester that contains dibasic acid copolymer units more, and has a crystallinity lower, than those of the second polyester layer.

With the above two-layer structure, the first polyester layer located on the side of the can body is rich in softness and flexibility, easily follows the deformation of aluminum in the step in which it is formed into a seamless can, and maintains a larger adhesiveness to the non-chromium inorganic surface-treating film formed on the surface of the can body. Besides, the second polyester layer located on the outer surface side has a degree of crystallinity higher than that of the first polyester layer and, therefore, has high mechanical properties such as strength and the like, and is more resistant against the external force exerted from the outer surface side. This effectively prevents the occurrence of fine scratches during the working that follows the working for seamless forming.

MODES FOR CARRYING OUT THE INVENTION

Figure 1:
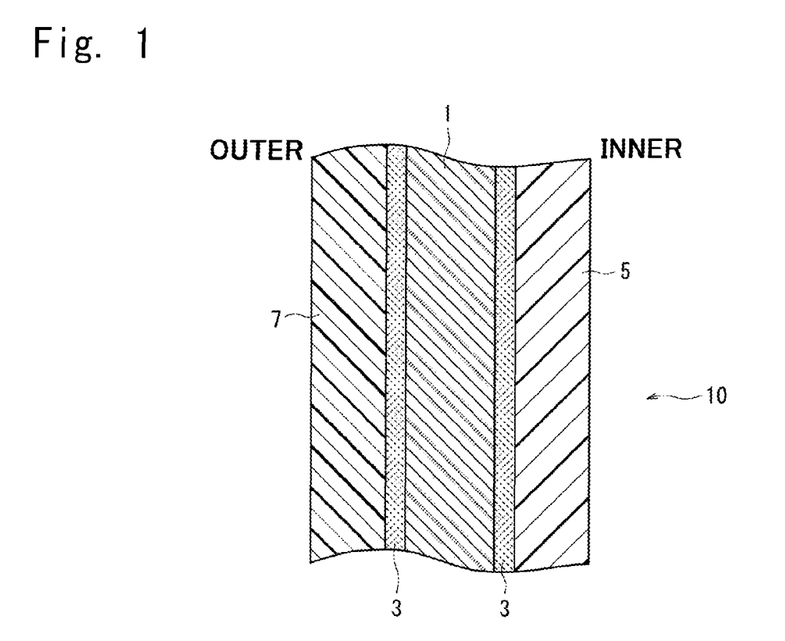
FIG. 1 is a view illustrating a structure in cross section of a seamless aluminum can of the present invention.

Referring to FIG. 1 illustrating a structure in cross section of a seamless aluminum can of the present invention, the seamless can generally designated at 10 is constituted by a can body 1 made of aluminum, inorganic surface-treating films 3, 3 formed on the inner and outer surfaces of the can body 1, and polyester resin coatings 5, 7 formed on the inner and outer surfaces of the can body 1 via the inorganic surface-treating films 3.

<Can Body 1 Made of Aluminum>

The can body 1 may be made of not only pure aluminum but also an alloy of aluminum with other metals, such as an aluminum alloy containing magnesium or manganese. As the aluminum alloy, there can be raised aluminum, aluminum-copper alloy, aluminum-manganese alloy, aluminum-silicon alloy, aluminum-magnesium alloy, aluminum-magnesium-silicon alloy, aluminum-zinc alloy, aluminum-zincmagnesium alloy and the like. Specifically, from the standpoint of corrosion resistance and workability, it is desired to use those alloys in a range, on the weight basis, of Mg: 0.2 to 5.5%, Si: 0.05 to 1%, Fe: 0.05 to 1%, Cu: 0.01 to 0.35%, Mn: 0.01 to 2%, Cr: 0.01 to 0.4% and, particularly, an alloy of the series of #3000. These aluminum alloys have been known as taught in, for example, WO2007/091740.

The thickness of the can body 1 varies depending on the draw working for seamless forming, on the degree of the draw working, on the thickness of the blank of before the working for seamless forming, on the use thereof, and cannot be definitely specified. In the case of general cans for beverages, however, the aluminum blank of a thickness of about 0.15 to 0.40 mm and, specifically, about 0.20 to 0.30 mm is subjected to the working for seamless forming so as to assume a thickness of, usually, about 20 to 50% and, specifically, about 30 to 45% of the initial blank thickness.

<Inorganic Surface-Treating Films 3>

The inorganic surface-treating films 3 are non-chromium type films, and are formed by subjecting, to the non-chromium type conversion treatment, the blank of aluminum or aluminum alloy for forming the can body 1. The inorganic surface-treating films 3 comprise chiefly an inorganic compound, and are inorganic films containing no organic compound.

The non-chromium type surface treatment is to treat the surfaces of the blank by using an acid aqueous solution that contains a water-soluble metal compound of a metal such as zirconium or titanium, and a phosphoric acid compound.

In the invention, from the standpoint of, specifically, corrosion resistance and close adhesion of the polyester to the inner and outer surface coatings 5, 7 that will be described later, it is desired that the inorganic surface-treating films 3 contain zirconium and phosphorus, e.g., contain zirconium atoms in amounts of 3 to 30 mg/m$^2$ and phosphorus atoms in amounts of 1 to 15 mg/m$^2$.

The non-chromium inorganic surface-treating films 3 containing zirconium and phosphorus have been known as disclosed in JP-A-2007-76012, and are formed by using, for example, $H_2ZrF_6$, $(NH_4)_2ZrF_6$, $K_2ZrF_6$, $Na_2ZrF_6$ or $Li_2ZrF_6$ as the water-soluble compound and by using phosphoric acid, a salt thereof, condensed phosphoric acid or a salt thereof as the phosphorous compound. Thus the zirconium and phosphorus are made present in the form of $Zr_3(PO_4)\cdot nH_2O$ or $ZrO_2\cdot nH_2O$ in the film. Therefore, the inorganic surface-treating films 3, usually, contain a zirconium phosphate component.

In the aqueous solution containing zirconium and phosphorus, the content of zirconium is, usually, 100 to 10,000 mg/L and, specifically, 300 to 1,000 mg/L, and the content of phosphorus is, usually, 100 to 10,000 mg/L and, preferably, 300 to 1,000 mg/L.

Moreover, the pH of the aqueous solution is, usually, adjusted to lie in a range of 2.5 to 5.5 and, specifically, 2.8 to 4.0. The surfaces of aluminum are etched to a suitable degree in the above-mentioned pH range, and the inorganic surface-treating films 3 are formed containing zirconium and phosphorus in amounts as described above.

The aqueous solution for the conversion treatment may, as required, be blended with an etching assistant, chelating agent and pH-adjusting agent.

As the etching assistant, there can be exemplified hydrogen peroxide, hydrofluoric acid, hydrofluorate, and fluoroboric acid.

As the chelating agent, there can be exemplified acids that form complexes with aluminum, such as citric acid, tartaric acid, gluconic acid and metal salts thereof.

As the pH-adjusting agent, there can be exemplified acids that do not adversely affect the surface treatment, such as phosphoric acid, condensed phosphoric acid, hydrofluoric acid, nitric acid, perchloric acid, sulfuric acid, sodium nitrate, ammonium hydroxide, sodium hydroxide and ammonia, or salts thereof.

In the invention, the non-chromium type surface-treating films 3 are, most desirably, obtained by the conversion treatment by using the zirconium compound and the phosphorus compound from the standpoint of close adhesion to the polyester resin coatings 5, 7 on the inner and outer surfaces, and are, usually, formed maintaining a thickness of about 5 to 100 nm on the surfaces of the aluminum blank of before being put to the working for seamless forming.

<Resin Coatings 5, 7 on the Inner and Outer Surfaces>

In the invention, as the polyester for forming resin coatings on the inner and outer surfaces, there is used a copolyester containing a dibasic acid as the copolymer component, i.e., a lowly crystalline polyester. If concretely described, the lowly crystalline polyester is a copolyester that contains a main ester unit formed of a diol and a dibasic acid, and a copolyester unit having the same diol component as that of the main ester unit but having a dibasic acid component different from that of the main ester unit. The copolyester incorporates the dibasic acid copolymer unit and is lowly crystalline. Therefore, the copolyester has softness and flexibility of degrees higher than those of the homopolyester that contains no copolymer component. Therefore, even if subjected to the severe working for seamless forming, the copolyester easily follows the deformation of the aluminum material of during the working and, therefore, maintains a high degree of adhesiveness. Specifically, the copolyester effectively prevents the occurrence of scratches or peeling during the working that follows the working for forming seamless cans.

As the diol component used for forming the main ester unit, there can be exemplified ethylene glycol, propylene glycol, 1,4-butane diol, diethylene glycol, 1,6-hexylene glycol, cyclohexanedimethanol and ethylene oxide adduct of bisphenol A.

As the dibasic acid component, there can be exemplified aromatic dicarboxylic acids such as terephthalic acid, isophthalic acid, phthalic acid and naphthalenedicarboxylic acid; alicyclic dicarboxylic acids such as cyclohexanedicarboxylic acid and the like; and aliphatic dicaroxylic acids such as succinic acid, adipic acid, sebacic acid and dodecanedioic acid.

In the invention, as the main ester unit, it is desired to use an ethylene terephthalate unit, ethylene naphthalate unit or butylene terephthalate unit and, specifically, it is most desired to use the ethylene terephthalate unit from the standpoint of workability for forming and heat resistance.

It is desired that the copolyester unit having the same diol component as that of the main ester unit but having the dibasic acid component different from that of the main ester unit, is present at a ratio of 8 to 17 mol % in the whole ester units. If the content of the copolyester units is too large, the polyester formed of the main ester units exhibits deteriorated properties (e.g., strength and the like) and if the content of the copolyester units is too small, it is probable that the adhesiveness thereof to the aluminum material (can body 1) decreases.

Preferred examples of the copolyester unit varies depending on the kind of the main ester unit and cannot be definitely specified. Generally, however, it is desired to use an ester unit that contains the isophthalic acid as the dibasic acid if the main ester unit is the ethylene terephthalate unit, ethylene naphthalate unit or butylene terephthalate unit.

In the invention, further, it is necessary that a polybasic acid having a valence of 3 or more has been introduced into the lowly crystalline polyester (copolyester). That is, the inner and outer surface coatings 5, 7 are formed by laminating the above-mentioned lowly crystalline polyester onto the inorganic surface-treating films on the surfaces of the aluminum material (blank) by melt extrusion. Here, however, the lowly crystalline polyester tends to develop neck-in (phenomenon in which the film-like resin that is melt-extruded assumes a width narrower than the width of the die outlet) at the time when it is extrusion-laminated. The neck-in causes irregularity in the thickness of the inner and outer surface coatings 5, 7 and dispersion in the properties such as close adhesion. In the present invention, however, upon introducing the dibasic acid copolymer unit and the polybasic acid copolymer unit having a valence of 3 or more, the lowly crystalline polyester exhibits improved melt fluidity and effectively suppresses the occurrence of neck-in.

As the polybasic acid having a valence of 3 or more, though not limited thereto only, there can be exemplified trimellitic acid, pyromellitic acid, hemimellitic acid, 1,1,2-ethanecarboxylic acid, 1,1,22,2-ethanetricarboxylic acid, 1,3,5-pentanetricarboxylic acid, 1,2,3,4-cyclopentanetetracarboxylic acid and biphenyl-3,4,3',4'-tetracarboxylic acid and, most desirably, the trimellitic acid.

The polybasic acid is used in an amount of 0.01 to 0.5 mol % per the whole acid components (inclusive of the polybasic acid) for forming the polyester. If the amount thereof is smaller than the above range, the neck-in tends to increase and if the amount thereof exceeds the above range, the pressure of extrusion at the time of lamination increases and controlling the thickness of the film loses stability.

It is desired that the above copolyester has a molecular weight large enough for forming films and, usually, has a glass transition point (Tg) of 50 to 90° C., specifically, 55 to 80° C., and a melting point (Tm) in a range of 200 to 275° C. and, specifically, 220 to 270° C. from the standpoint of film formability, heat resistance and strength.

In the invention, the most desired polyester for forming the inner and outer surface coatings 5, 7 is a lowly crystalline polyester (copolyester) having an ethylene terephthalate unit as a main ester unit, and having an ethylene isophthalate unit and a trimellitic ester unit as copolyester units.

In the invention, the inner and outer surface coatings 5, 7 of lowly crystalline polyester are formed on the surface-treating films of the aluminum blank of before the working for seamless forming in a thickness in a range of 0.1 to 20 μm and, specifically, about 8 to 16 μm, and are thinned together with the aluminum blank through the working for seamless forming. In the case of ordinary beverage cans, in general, the thickness becomes 20 to 50% of the thickness of the can body 1 of which the thickness is reduced through the working for seamless forming. If the thickness is too small, it becomes difficult to suppress the surface roughening of the aluminum material during the working for forming and the coatings tend to be easily peeled. Even if the thickness is too large, on the other hand, no particular advantage is brought about but rather the cost increases and it may become difficult to carry out the working for forming the aluminum material into cans.

The seamless aluminum can of the invention having the above-mentioned structure can be designed in various ways. For example, the inner and outer surface coatings 5, 7 of lowly crystalline polyester can be formed in a two-layer constitution.

Figure 2:
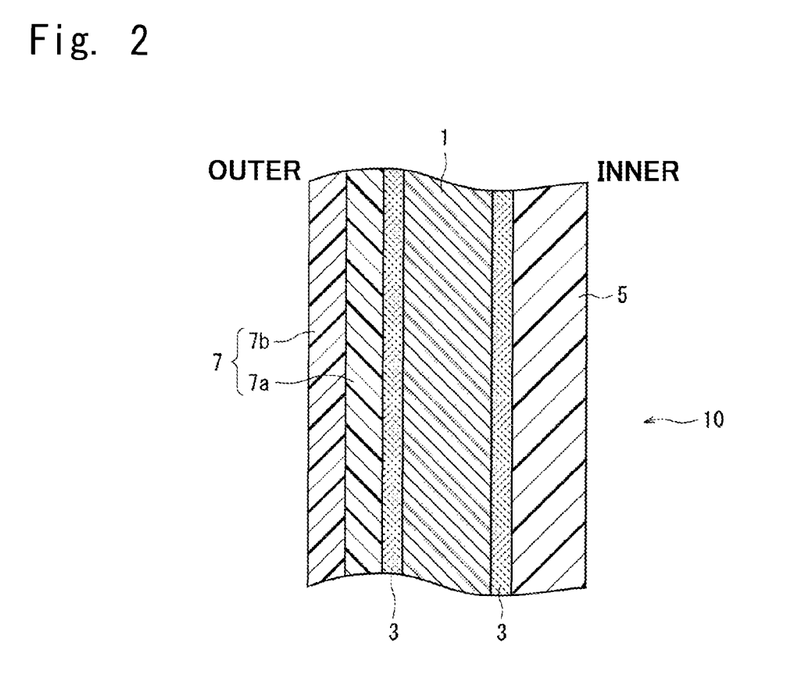
FIG. 2 is a view illustrating another structure in cross section of a seamless aluminum can of the present invention.
Figure 3:
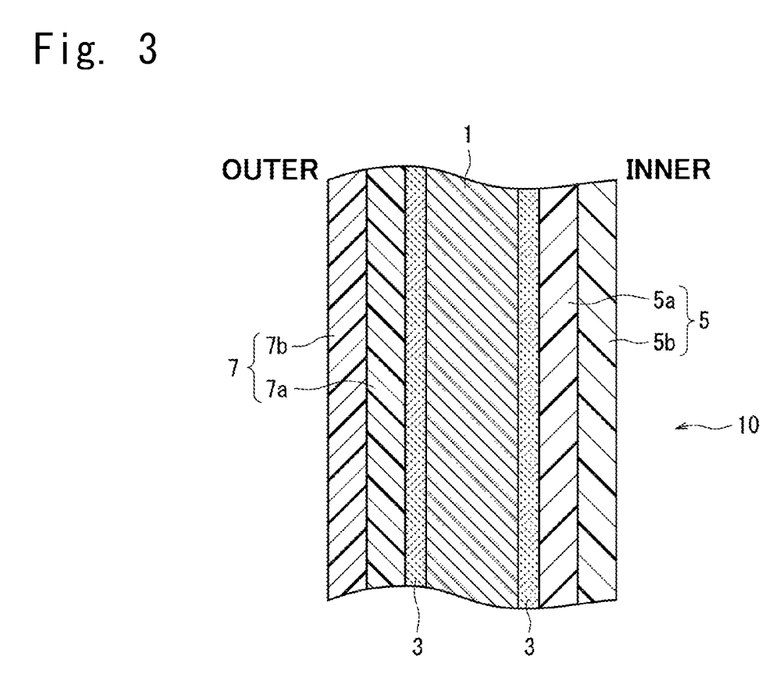
FIG. 3 is a view illustrating a further structure in cross section of a seamless aluminum can of the present invention.

That is, FIG. 2 illustrates an embodiment in which the outer surface coating 7 comprises a first layer 7a on the inner surface side (on the side of the can body 1) and a second layer 7b on the outer surface side. Further, FIG. 3 illustrates an embodiment in which the outer surface coating 7 comprises a first layer 7a on the inner surface side and a second layer 7b on the outer surface side and, at the same time, the inner surface coating 5, too, comprises a first layer 5a on the outer surface side (on the side of the can body 1) and a second layer 5b on the inner surface side. In the following description, the first layers on the side of the can body 1 are often referred to as lower layers and the second layers on the inner and outer surface sides are often referred to as surface layers.

In the above two-layer structure, the lowly crystalline polyester forming the first layer 7a or 5a on the side of the can body 1 has more dibasic acid copolymer units and lower crystallinity than those of the second layer 7b or 5b exposed on the outer surface or the inner surface. For example, it is desired that the content of the copolyester units having the dibasic acid component different from that of the main ester unit is present at a ratio of 8 to 17 mol % and, preferably, 13 to 17 mol % in the whole ester units in the first layer 7a or 5a, is present at a ratio of 5 to 10 mol % in the whole ester units in the second layer 7b on the outer surface side, and is present at a ratio of 0 to 10 mol % in the whole ester units in the second layer 5b on the inner surface side; i.e., the content of the copolyester units in the first layer 7a or 5a is larger than that in the second layer 7b or 5b. If the content thereof in the second layer 7b is smaller than the above range, adhesiveness is low between the printed ink and the polyester resin and the ink tends to be peeled at portions to where shock was given. If the content thereof is larger than the above range, then the resin becomes so soft that the cans may be easily scratched during the transit.

That is, the first layers 7a, 5a on the side of the can body 1 (on the side of the inorganic surface-treating films 3) contain more copolyester units and are richer in softness and flexibility than the second layers 7b, 5b. Therefore, during the severe working for forming seamless cans, the first layers 7a, 5a reliably follow the aluminum material that has inorganic surface-treating films formed on the surfaces thereof, and maintain a high degree of adhesiveness. On the other hand, the second layers 7b, 5b on the outer surface side or the inner surface side come into direct contact with a working jig (e.g., punch, dies, etc.) during the working for forming. However, the second layers 7b, 5b are more highly crystalline than the first layers 7a, 5a, have higher resistance against the external pressure, and are capable of effectively suppressing the occurrence of scratches during the working for forming.

In the above two-layer structure, it is desired that the total thickness of the first layers 7a, 5a and the second layers 7b, 5b is within the range described above concerning the inner and outer surface coatings 5, 7, and that the thickness ratio of the first layers 7a, 5a and the second layers 7b, 5b (first layer/second layer) is within a range of 10/90 to 90/10 from the standpoint of exhibiting the properties of the first layers 7a, 5a and the second layers 7b, 5b to a sufficient degree.

In this embodiment, further, it is important that an ester unit stemming from a polybasic acid and having a valence of 3 or more has been introduced to the copolyester that forms the first layers 7a, 5a. This is because the copolyester forming the first layers 7a, 5a contains much copolymer components and tends to develop neck-in more easily.

Though not shown in FIG. 2 or 3, it is allowable as a matter of course that the resin coating 5 on the inner surface side only is formed in the two-layer structure. According to the present invention, however, it is desired that the resin coating 7 on at least the outer surface side is formed in the two-layer structure. Namely, after the seamless can is formed, after-treatments are conducted such as necking and wrap-seam working. During the after-treatments, external pressure is given to the resin coating 7 on the outer surface side due to the jigs for working. Therefore, a larger strength is required.

Further, though not shown in FIGS. 1 to 3, in the seamless aluminum can 10 of the present invention, it is also allowable to form the inner and outer surface resin coatings 5, 7 on the non-chromium inorganic surface-treating films 3 via a primer layer to obtain a higher adhesiveness between the inner and outer resin coatings 5, 7 and the inorganic surface-treating films 3 (can body 1).

The primer layer can be formed by using a known primer, such as a coating material of an epoxyacrylic resin or a carboxylic acid-rich polyester resin. The primer layer has a very small thickness and is formed, usually, in a thickness of about 0.1 to about 4.5 μm, on the surface-treating film of the aluminum blank of before being put to the working for seamless forming. The thickness is reduced to 20 to 50% of the thickness through the working for seamless forming.

<Production of the Seamless Aluminum Can 10>

The seamless aluminum can 10 of the invention described above can be produced by a method known per se, but forming the resin coatings 5, 7 on the inner and outer surfaces by using a lowly crystalline polyester into which have been introduced a copolymer unit stemming from the polybasic acid having a valence of 3 or more in addition to the above-mentioned copolymer unit stemming from the dibasic acid.

That is, the above-mentioned blank (aluminum material) of aluminum or aluminum alloy is provided, the surfaces of the aluminum material are subjected to the non-chromium conversion treatment by using a predetermined treating solution to form inorganic surface-treating films thereon, followed by washing with water. As required, a primer is applied to form a primer layer on the inorganic surface-treating films and, thereafter, resin coatings are formed on the inner and outer surfaces by extrusion-laminating the above-mentioned lowly crystalline polyester thereon to thereby prepare a resin-coated aluminum material for forming cans.

The thus obtained resin-coated aluminum material is punched, and is subjected to the working for seamless forming such as draw working, draw/re-draw working, draw ironing working, bend-elongation working, and bend-elongation ironing working to obtain a desired seamless aluminum can.

The thus produced seamless aluminum can is suitably subjected to the necking, flanging, filling the content and wrap-seaming the lid and is, further, subjected to the heat-sterilization at a low temperature and retort sterilization depending on the kind of the content, and is put to sale.

In the seamless aluminum can of the present invention thus obtained, the surface-treating films 3 provided on the aluminum can body 1 are non-chromium inorganic surface-treating films containing no chromium and are, therefore, excellent from the standpoint of environment and sanitation. Besides, since the surface-treating films 3 contain no organic material, it becomes easy to control the concentration and the like in the treating vessel in which the conversion treatment is conducted making it, therefore, possible to effectively avoid a decrease in the productivity and an increase in the cost that result from cumbersome control operations.

Besides, the inner and outer surface resin coatings 5, 7 on the inorganic surface-treating films 3 are formed by using the lowly crystalline polyester in which a copolymer unit stemming from the polybasic acid having a valence of 3 or more has been introduced. This suppresses the occurrence of neck-in of the resin at the time of extrusion lamination and produces very large adhesiveness between the resin coatings 5, 7 and the inorganic surface-treating films (can body 1), effectively preventing the occurrence of scratches during the after-treatments such as necking of the can and the wrap-seaming and, further, effectively preventing the resin coatings 5, 7 from peeling if the resin coatings 5, 7 have received thermal hysteresis due to the subsequent sterilization treatment providing, therefore, a very great commercial value.

EXAMPLES

The invention will now be described by the following Experiments.

Experiment 1

[Production of the Polyester Resin-Coated Aluminum Sheet]

A 0.28 mm-thick coil sheet of an aluminum alloy, JIS3104, was conversion treated on its both surfaces with the "Alodine N-405" manufactured by Nihon Parkerizing Co. to form a surface-treating film of zirconium phosphate thereon in an amount of 10 mg/m$^2$ calculated as Zr. The surface that becomes the outer surface of the can was roll-coated with a polyester phenol type primer, dried, baked at 250° C. to form a primer of a thickness of 0.9 μm thereon, and was taken up.

While rewinding the coil sheet, a polyester resin was extrusion-laminated on both surfaces thereof. On the outer surface of the can, there was formed a polyester resin coating of a two-layer structure comprising a lower layer of a 7-μm thick polyethylene terephthalate containing 15 mol % of isophthalic acid and 0.1 mol % of trimellitic acid (hereinafter expressed as PET/IA15TMA0.1) and an upper layer of a 3-μm thick PET/IA7.5. The polyester resin on the inner surface side of the can was the same as the resin on the outer surface side of the can. Thereafter, the glamour wax was applied onto the inner and outer surfaces thereof, and the coil was taken up to thereby produce the polyester resin-coated aluminum sheet.

[Laminating Method]

The polyester resin was laminated on both surfaces of the coil by using a laminator shown in FIG. 1 of JP-A-2004-25640 under the conditions of a speed of 100 m/min, a resin extrusion temperature of 240° C., an extruder T-die resin width of 950 mm, and a distance of 100 mm from the T-die extrusion slit to a point at where the resin film comes in contact with the laminating roll.

[Forming the Seamless Can]

The polyester resin-coated aluminum sheet was blanked, drawn and redraw-ironed in a customary manner, trimmed at its open end to a predetermined size, heat-set at 200° C. for 30 seconds, printed on the outer surface thereof, coated with a finishing varnish, baked at 200° C. for 40 seconds, necked at its open end, and was flanged to obtain a seamless can of a capacity of 350 ml having a can body of 211-diameter and a neck portion of 206-diameter.

For conducting the trimming, the can side wall was held by using a circular cutter on the outer side of the can and a circular cutter on the inner side of the can, and the cutters were turned to cut the can over the whole circumference thereof.

[Evaluating the Trimming Property]

The obtained trimmed cans were observed at their trimmed portions with the naked eye. Twenty-four cans were observed. Of the 24 cans, portions of the resin stretching most beyond the trimmed ends were evaluated on the following basis. Marks ⊚, ○ and Δ represent that the cans are acceptable as products.

⊚: Resin was stretched by less than 0.1 mm.
○: Resin was stretched by not less than 0.1 mm but less than 0.5 mm.
Δ: Resin was stretched by not less than 0.5 mm but less than 1.0 mm.
×: Resin was stretched by not less than 1.0 mm.

[Evaluating the Scratch-Caused Delamination on the Outer Surface]

The obtained seamless cans were cut by using a cutter knife at the portion of the smallest diameter in their neck portion from the outer surface deep enough to reach the metal surface along the circumference, and were dipped in tap water followed by a heat treatment at 90° C. for 30 minutes. The ratio (%) of length of the portion where the resin coating was peeled starting from the cut point was found relative to the whole circumferential length of the can. Measurement was taken from the 24 cans. An average delamination ratio was found from the 24 cans and was used for evaluating the scratch-caused delamination on the outer surfaces.

⊚: Average delamination ratio was less than 5%.
○: Average delamination ratio was not less than 5% but was less than 10%.
Δ: Average delamination ratio was not less than 10% but was less than 30%.
×: Average delamination ratio was not less than 30%.

[Evaluating the Neck-In]

The degree of neck-in at the time of the extrusion lamination was evaluated in a manner as described below. A difference was found between the width of resin of 950 mm at the outlet of the T-die and the width of resin on the sheet on which it was laminated, and a half value thereof was regarded to be the neck-in length on a half side of the sheet. The coil was examined over a length of 100 m, a maximum value in this range was regarded to be a maximum neck-in length, evaluated on the following basis, and was used for evaluating the lamination-caused neck-in.

⊚: A maximum neck-in length was less than 30 mm.
○: A maximum neck-in length was not less than 30 mm but was less than 50 mm.
Δ: A maximum neck-in length was not less than 50 mm but was less than 80 mm.
×: A maximum neck-in length was not less than 80 mm.

Experiments 2 to 16

Polyester resin-coated aluminum sheets and seamless cans were produced in the same manner as in Experiment 1 but changing the amount of the surface treatment, kind of the primer, thickness of the primer film, and resin composition on the outer surface as shown in Table 1.

The surface treatment in Experiment 13 was the titanium phosphate type conversion treatment using the PALCOAT 3750 manufactured by Nihon Parkarizing Co. The amount of titanium (Ti) was set to be 10 mg/m$^2$. In other respects, Experiment 13 was the same as Experiment 1.

Experiment 14 was conducted in the same manner as in Experiment 1 but using an epoxyphenol type primer as the primer.

In Experiment 10, the lamination-caused neck-in was evaluated to be favorable. However, the viscosity of the resin was high at the time of extrusion, the pressure for extrusion was large, and the extrusion lamination was conducted lacking smoothness and stability to a slight degree though it was within the allowable range.

In Experiment 11, further, though within the allowable range, the printed ink peeled to a slight degree at the portions where shocks were given to the cans during the transit of the cans.

TABLE 1

| | Surface treatment Amount of Zr (mg/m$^2$) | Primer Kind | Primer Film thickness (μm) | Surface layer resin Composition (mol %) | Lower layer resin Composition (mol %) | TMA (mol %) | Evaluation *2 | *3 | *4 | *5 |
|---|---|---|---|---|---|---|---|---|---|---|
| Ex. 1 | 10 | A | 0.9 | IA7.5 | IA15 | 0.1 | ⊚ | ⊚ | ⊚ | |
| 2 | 3 | A | 0.9 | IA7.5 | IA15 | 0.1 | ⊚ | Δ | ⊚ | |
| 3 | 30 | A | 0.9 | IA7.5 | IA15 | 0.1 | ⊚ | Δ | ⊚ | |
| 4 | 10 | — | — | IA7.5 | IA15 | 0.1 | ⊚ | Δ | ⊚ | |
| 5 | 10 | A | 0.1 | IA7.5 | IA15 | 0.1 | ⊚ | Δ | ⊚ | |
| 6 | 10 | A | 4.5 | IA7.5 | IA15 | 0.1 | ⊚ | ⊚ | ⊚ | |
| 7 | 10 | A | 0.9 | IA7.5 | IA8 | 0.1 | ⊚ | Δ | ⊚ | |
| 8 | 10 | A | 0.9 | IA7.5 | IA17 | 0.1 | Δ | ⊚ | Δ | |
| 9 | 10 | A | 0.9 | IA7.5 | IA15 | 0.01 | ⊚ | ⊚ | Δ | |
| 10 | 10 | A | 0.9 | IA7.5 | IA15 | 0.5 | ⊚ | Δ | ⊚ | *6 |
| 11 | 10 | A | 0.9 | IA5 | IA15 | 0.1 | ⊚ | ○ | ⊚ | *7 |
| 12 | 10 | A | 0.9 | IA10 | IA15 | 0.1 | Δ | ⊚ | ⊚ | |
| 13 | *1 | A | 0.9 | IA7.5 | IA15 | 0.1 | ⊚ | ⊚ | ⊚ | |
| 14 | 10 | B | 0.9 | IA7.5 | IA15 | 0.1 | ⊚ | ⊚ | ⊚ | |
| 15 | 0 | A | 0.9 | IA7.5 | IA15 | 0.1 | ⊚ | × | ⊚ | |
| 16 | 10 | A | 0.9 | IA7.5 | IA15 | 0 | ⊚ | ⊚ | × | |

Primer A (polyester phenol type primer), Primer B (epoxy phenol type primer).
*1: Ti type 10,
*2: Trimming property,
*3: Scratch-caused delamination on the outer surface,
*4: Neck-in,
*5: Others,
*6: laminated slightly lacking stability,
*7: ink peeled a little at shocked portions

DESCRIPTION OF REFERENCE NUMERALS

1: aluminum can body
3: non-chromium inorganic surface-treating films
5: inner surface resin coating of a lowly crystalline polyester
7: outer surface resin coating of a lowly crystalline polyester
10: seamless aluminum can

The invention claimed is:

1. A resin-coated seamless aluminum can having polyester resin coatings formed on inner and outer surfaces thereof,
said polyester resin coatings being, respectively, formed on the inner and outer surfaces of an aluminum can body via non-chromium inorganic surface-treating films, and
said polyester resin coatings being formed of lowly crystalline polyester to which have been introduced a copolymer unit stemming from a dibasic acid and a copolymer unit stemming from a polybasic acid having a valence of 3 or more, wherein
the polyester resin coatings formed on the inner and outer surfaces contain the polybasic acid copolymer component at a ratio of 0.01 to 0.5 mol % per the whole acid components;
the polyester resin coating formed on the outer surface side has a two-layer structure including a first polyester layer located on the side of the can body and a second polyester layer located on the outer surface side, and the first polyester layer contains more dibasic acid copolymer units than the second polyester layer; and
in the polyester resin coating having a two-layer structure formed on the outer surface side, the first polyester layer located on the side of the can body contains the copolyester unit at a ratio of 13 to 17 mol % in the whole ester units, and the second polyester layer located on the outer surface side contains the copolyester unit at a ratio of 5 to 10 mol % in the whole ester units.

2. The resin-coated seamless aluminum can according to claim 1, wherein in said polyester resin coatings formed on the inner surface of the can and on the outer surface side of the can, said polybasic acid having a valence of 3 or more is a trimellitic acid.

3. The resin-coated seamless aluminum can according to claim 1, wherein said polyester resin coatings formed on the inner surface of the can and on the outer surface side of the can are formed of polyethylene terephthalate that contains a unit stemming from an isophthalic acid as a dibasic acid copolymer unit.

4. The resin-coated seamless aluminum can according to claim 1, wherein said polyester resin coating formed on the inner surface side of the can contains a copolyester unit stemming from the dibasic acid copolymer unit at a ratio of 8 to 17 mol % in the whole ester units.

5. The resin-coated seamless aluminum can according to claim 1, wherein the first polyester layer has a crystallinity lower than that of the second polyester layer.

6. The resin-coated seamless aluminum can according to claim 1, wherein at least said polyester resin coating formed on the outer surface side is formed on said non-chromium inorganic surface-treating film via a primer layer.

7. The resin-coated seamless aluminum can according to claim 1, wherein said non-chromium inorganic surface-treating film contains zirconium phosphate.

8. The resin-coated seamless aluminum can according to claim 7, wherein said non-chromium inorganic surface-treating film contains zirconium atoms in amounts of 3 to 30 mg/m$^2$ and phosphorus atoms in amounts of 1 to 15 mg/m$^2$.

* * * * *